United States Patent
Spaulding et al.

(10) Patent No.: US 10,119,817 B2
(45) Date of Patent: Nov. 6, 2018

(54) LASER LEVEL

(71) Applicant: STANLEY BLACK & DECKER INC., New Britain, CT (US)

(72) Inventors: James Spaulding, Bristol, CT (US); Michael T. Matteo, West Hartford, CT (US)

(73) Assignee: STANLEY BLACK & DECKER INC., New Britain, CT (US)

( * ) Notice: Subject to any disclaimer, the term of this patent is extended or adjusted under 35 U.S.C. 154(b) by 193 days.

(21) Appl. No.: 15/200,142

(22) Filed: Jul. 1, 2016

(65) Prior Publication Data

US 2017/0314921 A1    Nov. 2, 2017

Related U.S. Application Data

(60) Provisional application No. 62/328,842, filed on Apr. 28, 2016.

(51) Int. Cl.
| | | |
|---|---|---|
| *G01C 15/00* | (2006.01) | |
| *G02B 7/00* | (2006.01) | |
| *G02B 27/09* | (2006.01) | |
| *G02B 5/04* | (2006.01) | |

(52) U.S. Cl.
CPC ......... *G01C 15/002* (2013.01); *G01C 15/004* (2013.01); *G02B 7/001* (2013.01); *G02B 27/0988* (2013.01); *G02B 5/04* (2013.01)

(58) Field of Classification Search
CPC ..... G01C 15/00; G01C 15/002; G01C 15/004
USPC .................................................. 33/290, 291
See application file for complete search history.

(56) References Cited

U.S. PATENT DOCUMENTS

| | | | | |
|---|---|---|---|---|
| 784,511 A | * | 3/1905 | Belyeu ................. | G01C 15/004 33/291 |
| 3,471,234 A | * | 10/1969 | Studebaker .......... | G01C 15/004 33/285 |
| 4,751,782 A | * | 6/1988 | Ammann ............. | G01C 15/004 318/648 |
| 5,459,932 A | | 10/1995 | Rando et al. | |
| 5,782,003 A | * | 7/1998 | Bozzo .................. | G01C 15/004 33/285 |
| 5,819,424 A | | 10/1998 | Ohtomo et al. | |
| 6,754,969 B2 | | 6/2004 | Waibel | |

(Continued)

FOREIGN PATENT DOCUMENTS

| | | |
|---|---|---|
| DE | 20209856 | 10/2003 |
| EP | 1235051 | 8/2002 |

OTHER PUBLICATIONS

EP Search Report dated Sep. 7, 2017 for EP Application No. 17167022.

(Continued)

*Primary Examiner* — Christopher Fulton
(74) *Attorney, Agent, or Firm* — Stephen R. Valancius

(57) ABSTRACT

A laser beam generating device which includes a housing. A laser light generator is disposed in the housing and is operable to generate two output beams which project outside of the housing. The laser light generator includes a light source and a leveling mechanism on which the laser light generator is disposed. A mounting member is disposed on the housing and is configured to mount the laser beam generating device on a screw thread. The mounting member is movable relative to the housing between a first position and a second position.

19 Claims, 16 Drawing Sheets

(56) References Cited

U.S. PATENT DOCUMENTS

| | | | |
|---|---|---|---|
| 6,880,256 B2 | 4/2005 | Helms | |
| 7,121,010 B2* | 10/2006 | Marshall | G01C 15/004 33/286 |
| 7,152,334 B2 | 12/2006 | Gamal et al. | |
| 7,167,500 B2 | 1/2007 | Kallabis | |
| 7,454,839 B2 | 11/2008 | Della Bona et al. | |
| 7,675,612 B2 | 3/2010 | Kallabis | |
| 7,886,450 B1 | 2/2011 | Fiano | |
| 7,992,312 B2 | 8/2011 | Krasko | |
| 2001/0025426 A1* | 10/2001 | Fischer | F16M 11/041 33/290 |
| 2005/0155238 A1* | 7/2005 | Levine | G01C 15/004 33/286 |
| 2008/0078091 A1* | 4/2008 | McCracken | G01C 15/004 33/291 |
| 2009/0193671 A1* | 8/2009 | Sergyeyenko | G01C 15/02 33/290 |
| 2010/0313433 A1* | 12/2010 | Hayashi | G01C 15/004 33/291 |
| 2011/0265336 A1* | 11/2011 | Bascom | G01C 15/004 33/286 |
| 2015/0292886 A1 | 10/2015 | Bascom et al. | |

OTHER PUBLICATIONS

Picture and Instruction Manual of the Sola Line and Point Laser found on the site below. https://www.sola.at/global-en/products/iox5+basic-p3743.

Picture of the Golden Driva Spit 30 Cross-Line & Plumb-Bob Laser found on the site below. http://www.goldendriva.co.uk/cl-30/.

Pictures and Instruction Manual of a Stanley FatMax SCL-D Laser Level, publicly available before filing of the present application.

\* cited by examiner

LASER LEVEL

CROSS-REFERENCE TO RELATED APPLICATIONS

This application claims the benefit of U.S. Provisional Application No. 62/328,842 filed on Apr. 28, 2016, entitled Laser Level. The entire contents of U.S. Provisional Application No. 62/328,842 are incorporated herein by reference.

FIELD OF THE INVENTION

The present invention relates to laser levels.

BACKGROUND

There are various existing laser levels. It is desired to provide a laser level with flexible mounting options.

SUMMARY

According to an aspect of an exemplary embodiment, there is a laser beam generating device. The laser beam generating device includes a housing and a laser light generator disposed in the housing and operable to generate two output beams which project outside of the housing, the laser light generator including a light source. The laser beam generating device further includes a leveling mechanism on which the laser light generator is disposed and a mounting member disposed on the housing and configured to mount the laser beam generating device on a screw thread. The mounting member is movable relative to the housing between a first position and a second position.

The mounting member may include a first mounting thread.

The laser beam generating device may be configured such that in the first position, the first mounting thread is aligned with at least one of the two output beams and in the second position, the first mounting thread is offset with respect to the at least one of the two output beams.

The at least one of the two output beams may include a plumb beam.

The mounting member may further include a second mounting thread, the second mounting thread being of a different size than the first mounting thread.

The mounting member may be slidable between the first position and the second position.

The mounting member may include engagement members configured to secure the mounting member in the first position and the second position.

The housing may include engagement elements which engaged the engagement members to secure the mounting member in the first position and the second position.

The engagement members may include detents and the housing engagement elements comprise detent springs.

According to another aspect, there is a laser beam generating device, the device including a housing, a laser light generator disposed in the housing and operable to generate two output beams which project outside of the housing, the laser light generator including a light source, a leveling mechanism on which the laser light generator is disposed and a mounting block including a first mounting thread. The mounting block is secured to the housing and movable between a first position and a second position relative to the housing.

The mounting block may be slidable between the first position and the second position.

The housing may include a mounting rail and the mounting block is slidable along the mounting rail.

The mounting block may include detents configured to secure the sliding block at the first position and at the second position.

The mounting block may include a second mounting thread which is different in size than the first mounting thread.

In the first position, the first mounting thread may be aligned with at least one of the two output beams.

In the second position, the first mounting thread may be offset with respect to the at least one of the two output beams.

The at least one of the two output beams may include a plumb beam.

According to another aspect, there is a laser beam generating device, the device including a housing including at least one opening for emitting an output beam; a laser light generator disposed in the housing and operable to generate an output beam; a leveling mechanism on which the laser light generator is disposed; and a mounting member secured to the housing and configured to mount the laser beam. The mounting member is movable relative to the housing to at least a first position and a second position.

The mounting member may include a first mounting feature.

The output beam may be aligned with the first mounting feature when the mounting member is in the first position.

The output beam may be a plumb beam and when the housing is placed on a level horizontal surface and the mounting member is in the second position, the plumb beam passes in front of the first mounting feature.

The mounting feature may be a mounting thread.

The mounting block may include detents configured to secure the mounting block in the first position and the second position.

DETAILED DESCRIPTION OF EXEMPLARY EMBODIMENTS

Figure 1:
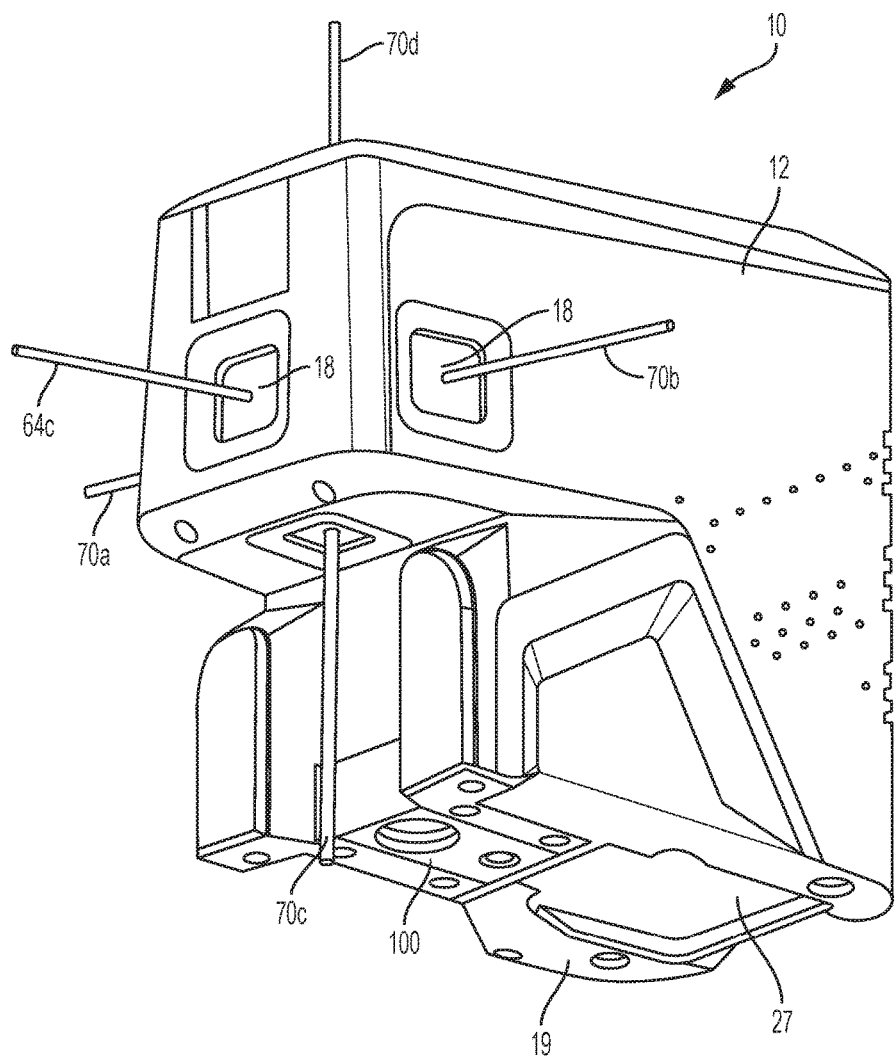
FIG. 1 illustrates an exemplary embodiment of a laser beam generating device with a mounting block in a first position.

An exemplary embodiment according to the present application is shown in FIGS. 1-15. As shown in the figures, the exemplary embodiment shows a laser level 10. In the exemplary embodiment, the laser level 10 projects five laser beams which product five dots. Various ways are known to generate an output of five dots including, for example, that shown in US Patent Application Publication No. 2015/0292886, which is hereby incorporated by reference in its entirety.

The present disclosure will now be described more fully with reference to the accompanying drawings. With reference to FIGS. 1-13, an example of a laser beam generating device 10 of the present disclosure is now presented. The laser beam generating device 10 generates multiple orthogonal light beams which are self-leveled when the laser beam generating device 10 rests on a support surface.

The laser beam generating device 10 includes a housing 12, a laser light generator 14, and a leveling mechanism 16. The housing 12 may include multiple pieces which form a cavity when joined together. The laser light generator 14 and the leveling mechanism 16 are disposed within the housing 12. The housing 12 defines multiple openings 18 each for emitting a generated light beam.

In the example embodiment, the laser light generator 14 emits up to five light beams along five directions. The laser light generator 14 includes a three beam generator 20, a two beam generator 22, an automatic power control (APC) circuit 21, and a power source (not shown). The three beam generator 20 emits three light beams and the two beam generator 22 emits two light beams, as described below. The APC circuit 21 controls the power provided to the generators 20, 22 from the power source. The power source may be, for example, one or more batteries.

The laser beam generating device 10 may be turned ON/OFF via a switch (not shown) disposed along the housing 12. The switch (not shown) is electrically coupled to the power source, which is electrically coupled to the APC circuit 21. Accordingly, when the switch (not shown) is placed in the ON position, the power source provides power to the APC circuit 21 which supplies power to one or both of the generators 20, 22.

As an alternative to turning on both the three beam generator 20 and the two beam generator 22, the switch (not shown) and the APC circuit 21 may be configured to select and turn on a specific number of beams from the laser beam generating device 10. For example, the switch (not shown) may include a three-beam, a two-beam and five-beam setting. Accordingly, when the switch (not shown is set to three beams, the APC circuit 21 supplies power to the three beam generator 20 and not the two beam generator 22. On the other hand, when the switch (not shown is set to two beams, the APC circuit 21 supplies power to the two beam generator 22 and not the three beam generator 20. Furthermore, when the switch (not shown is set to five beams the APC circuit 21 supplies power to the three beam generator 20 and the two beam generator 22. Once power is provided, the three beam generator 20 and/or the two beam generator 22 emit their respective light beams.

The laser light generator 14 is coupled to the leveling mechanism 16. The leveling mechanism 16 levels an optical axis 25 of the laser light generator 14 (optical axis 25 shown in FIG. 5). The leveling mechanism 16 includes a chassis 24 and a gimbal assembly 26. The chassis 24 houses the laser light generator 14. For example, the chassis 24 may define multiple bores 28 which hold the three beam generator 20 and the two beam generator 22. The APC circuit 21 and the power source may also be housed by or coupled to the chassis 24. While the bores 28 are depicted as one bore on top of the other, the bores may be arranged differently based on the configuration of the three beam generator 20 and two beam generator 22.

The gimbal assembly 26 pivotally couples the chassis 24 to the housing 12. In the example embodiment, the gimbal assembly 26 includes a plurality of bearings 30, at least two pins 32, and a gimbal frame 34. The gimbal frame 34 is fixedly coupled to the housing 12. The chassis 24 is rotatably coupled to the gimbal frame 34 via the pins 32 and the bearings 30. Accordingly, when the laser beam generating device 10 rests upon a support surface, the leveling mechanism 16 ensures that the chassis 24 is plumb, thereby leveling the optical axis 25 of the laser light generator 14. While a particular leveling mechanism is depicted, it would be appreciated by one skilled in the art that other leveling mechanism may be employed.

The leveling mechanism 16 may also include a lock mechanism (not shown) for enabling and disabling the self-leveling function of the leveling mechanism 16. For example, when the lock mechanism is engaged, the leveling mechanism may be in a manual state. In the manual state, the position of the chassis 24 is fixed, thereby disabling the pivotable motion for leveling the optical axis 25. On the other hand, when the lock mechanism is disengaged, the leveling mechanism 16 is in a self-leveling state in which the chassis 24 is pivotable and, thus, levels the optical axis 25.

The leveling mechanism 16 may also include a leveling indicator (not shown). The leveling indicator triggers an alarm when the leveling mechanism 16 reaches an end of its leveling range. For example, the leveling indicator may emit a sound, turn on a warning light, and/or provide other suitable signals.

The laser beam generating device 10 may be placed on and/or coupled to a surface. More particularly, the laser beam generating device 10 may include an attachment portion. For example, the attachment portion may be powered magnets which use magnetic force to couple to a surface, such as a beam, ceiling, etc. In addition to or in lieu of the powered magnets, the attachment portion may also include multiple legs that extend from a base of the housing 12. The legs elevate the housing 12 from the surface on which the laser beam generating device 10 is positioned by a predetermined distance.

In operation, the laser beam generating device 10 is positioned on a surface, such as a beam, ceiling, floor, etc. Based on the position of the laser beam generating device 10, the leveling mechanism 16 may level the optical axis 25 of the laser light generator 14. When the switch 23 is placed in the ON position, the laser beam generation device 10 emits multiple light beams along multiple directions. As visual indicators, the light beams extend in air as straight lines along mutually orthogonal axes and form a marker, such as a dot, on a surface that the light beam is incident on. In addition, based on a setting of the switch 23, the laser beam generating device 10 may emit two light beams, three light beams, or five light beams via the laser light generator 14.

With reference to FIGS. 5-8, an example of the laser light generator 14 is presented. For purposes of clarity, the figures may depict a dotted line to represent a given light beam in lieu of a beam, where the dotted line represents an axis of the light beam. The laser light generator 14 may emit three light beams via the three beam generator 20, two light beams via the two beam generator 22, or five light beams via both the three beam generator 20 and the two beam generator 22. The light beams emitted by the laser light generator 14 are orientated and aligned so as to appear to be originating from a common point 40.

Figure 5:
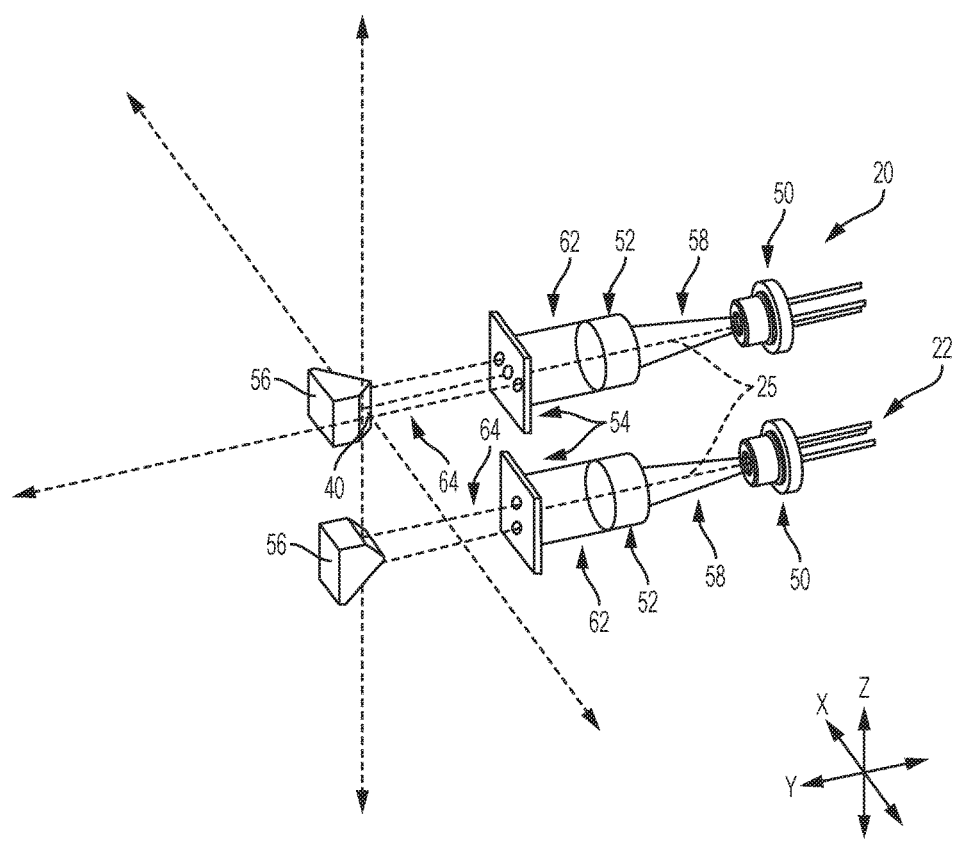
FIG. 5 is a perspective view of the laser light generator.

As shown in FIG. 5, each of the three beam generator 20 and the two beam generator 22 include a light source 50, collimating lens 52, a shaping member 54, and a beamsplitter 56. For ease of explanation, the direction of the light beams generated by the laser light generator 14 may be described with reference to a coordinate system provided in the figures.

The light source 50 projects a light 58 along the optical axis 25 which is parallel to the y-axis. The light source 50 emits the light 58 toward the beamsplitter 56. The light source 50 may be a laser diode or other suitable light emitting source.

The collimating lens 52 is disposed between the light source 50 and the beamsplitter 56 along the optical axis 25. The collimating lens 52 receives the light 58 and outputs a collimated light beam 62.

Figure 6A:
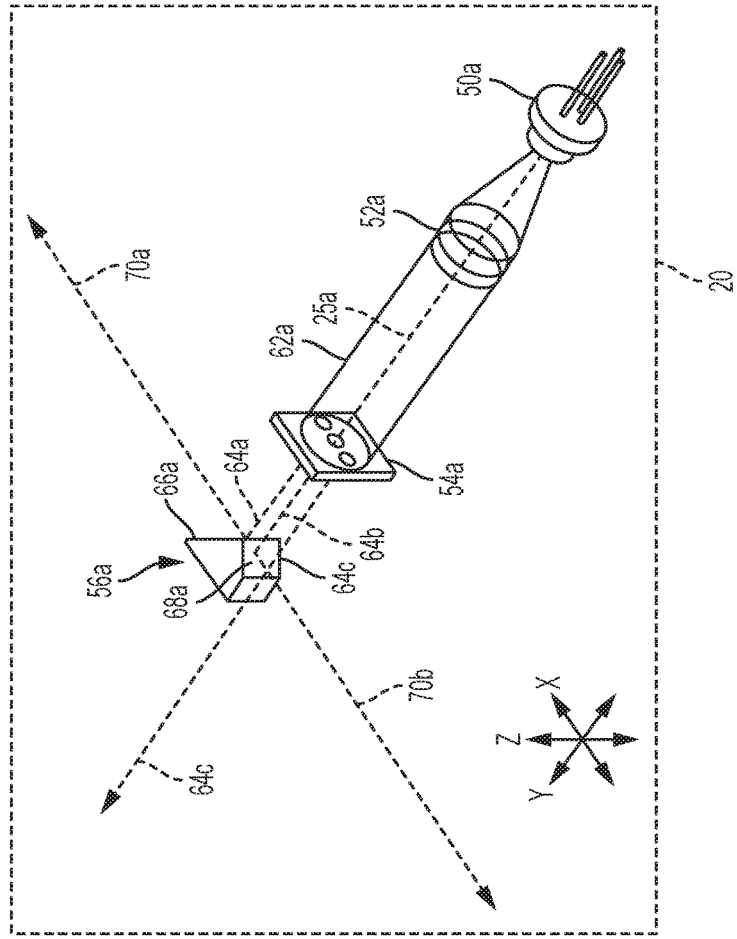
FIGS. 6A and 6B are perspective views of a three beam generator of the laser light generator.
Figure 7A:
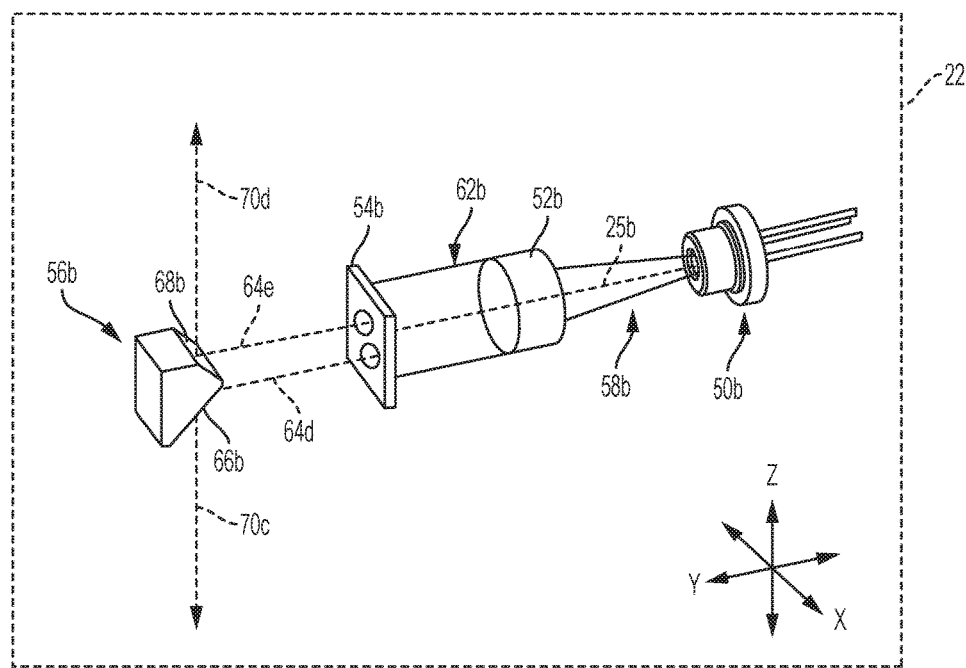
FIGS. 7A and 7B are perspective views of a two beam generator of the laser light generator.

Each generator 20, 22 includes a shaping member 54. In this exemplary embodiment, the shaping member 54 is disposed between the collimating lens 52 and the beamsplitter 56. The shaping member 54 defines at least one aperture through which a portion of the collimated light beam 62 passes. The apertures convert the collimated light beam 62 into multiple incident light beams 64 having a symmetrical cross-section. For example, as shown in FIG. 6A, the three beam generator 20 may include a three-hole shaping member 54a that forms three light beams 64a, 64b, 64c. These portions of the collimated light beam 62a have a circular cross-section. Furthermore, as shown in FIG. 7A, the two beam generator 22 may include a two-hole shaping member 54b that forms two light beams 64d, 64e. These portions of the collimated light beam 62b have a circular cross-section. While the apertures of the shaping member 54 are depicted as having a circular shape, other suitable shapes may be used to define the aperture.

For ease of explanation of the beamsplitter 56, when referring to the collimated light beam 62 in the following description, the collimated light beam 62 may also refer to the light beams 64 from the shaping member 54.

The beamsplitter 56 receives the collimated light beam 62 and splits the collimated light beam 62 into multiple light beams. With regard to the three beam generator 20, the light source 50a and the beamsplitter 56a of the three beam generator 20 are arranged and aligned with respect to each other such that the collimated light beam 62a is split into three light beams 64a, 64b, 64c (FIG. 6A). With regard to the two beam generator 22, the light source 50b and the beamsplitter 56b are arranged and aligned with respect to each other such that the collimated light beam 62b is split into two light beams 64d, 64e (FIG. 7A).

Figure 6B:
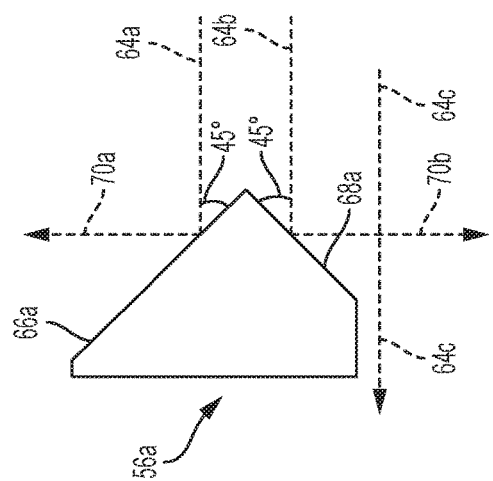

With reference to FIGS. 6A-6B, the beamsplitter 56a of the three beam generator 20 is arranged such that some of the collimated light beam 62a is incident to the beamsplitter 56a and some of the collimated light beam 62a bypasses the beamsplitter 56a. Specifically, the beamsplitter 56a has two incident surfaces (a first surface 66a and a second surface 68a) orientated at forty five degrees with respect to the optical axis 25a (y-axis) and ninety degrees with respect to each other. A first portion of the collimated light beam 62a (i.e., light beam 64a) is incident on the first surface 66a. The first portion 64a is reflected by the first surface 66a as a first output beam 70a. The first output beam 70a projects along a first direction orthogonal to the optical axis 25a. For example, as shown in FIG. 6A, the first direction is parallel to the x-axis. A second portion of the collimated light beam 62a (i.e., light beam 64b) is incident on the second surface 68a. The second portion 64b is reflected by the second surface 68a as a second output beam 70b. The second output beam 70b projects along a second direction which is opposite to the first direction, parallel to the x-axis.

The beamsplitter 56a is arranged such that a third portion of the collimated light beam 62a (i.e., light beam 64c) bypasses the beamsplitter 56a and is a third output beam 64c. The third output beam 64c projects parallel to the optical axis 25a, and is, therefore, orthogonal to the first direction and the second direction. Thus, the third output beam 64c is emitted from the three beam generator 20 without passing through and/or being incident on the beamsplitter 56a.

Figure 7B:
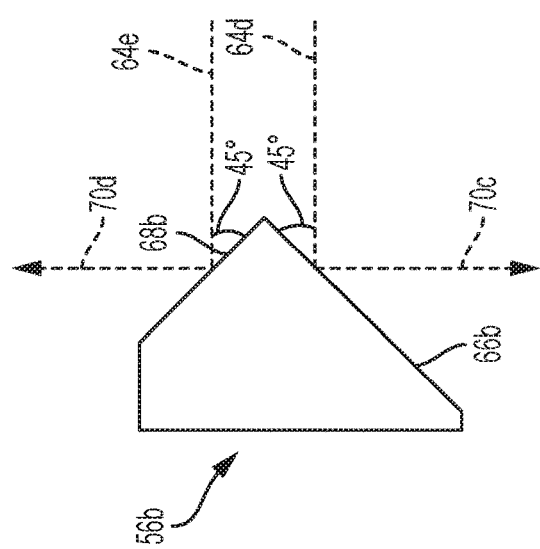

With reference to FIGS. 7A-7B, the beamsplitter 56b of the two beam generator 22 is arranged such that substantially all of the collimated light beam 62b is incident on the two surfaces 66b, 68b. More particularly, a first portion of the collimated light beam 62b (i.e., light beam 640 is incident on the first surface 66b of the beamsplitter 56b. The first portion 64d is reflected by the first surface 66b as a fourth output beam 70c. The fourth output beam 70c projects along a fourth direction orthogonal to the optical axis 25b (y-axis). For example, as shown in FIG. 7A, the fourth direction is parallel to the z-axis. A second portion of the collimated light beam 62b (i.e., light beam 64e) is incident on the second surface 68b of the beamsplitter 56b. The second portion 64e is reflected by the second surface 68b as a fifth output beam 70d. The fifth output beam 70d projects along a fifth direction opposite to the fourth direction, parallel to the z-axis.

In the example embodiment, the three beam generator 20 is arranged above and slightly offset from the two beam generator 22. It will be appreciated by one skilled in the art that the three beam generator 20 and the two beam generator 22 of the laser light generator 14 may be arranged in other suitable configurations and is not limited to the configuration depicted. In addition, while a particular direction for the light beams is depicted in the figures, the three beam generator 20 and the two beam generator 22 may be configured to generate the three light beams and the two light beams, respectively, in directions different from the ones depicted.

Figure 8:
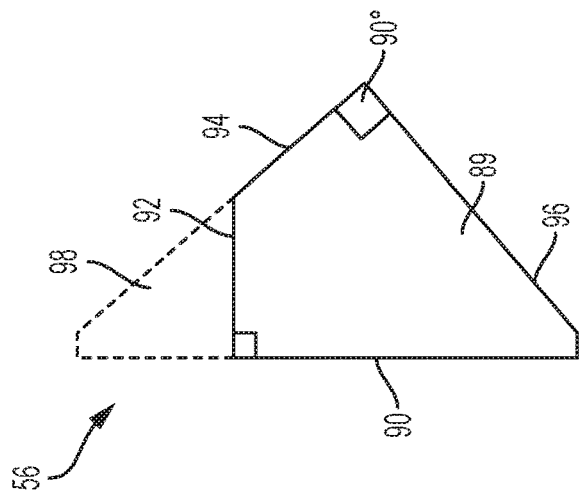
FIG. 8 is a perspective view of an example beamsplitter having a truncated triangular shape.

With reference to FIG. 8, the beamsplitter 56 may be a prism having a truncated triangular cross-section 89 (area within solid lines). For example, the beamsplitter 56 may have surfaces 90, 92, 94, 96. The surfaces 90, 92, 94, 96 form the truncated triangular cross-section 89, Surfaces 90, 94, and 96 may be viewed as the three sides of a triangular prism. A portion of the triangular prism is removed to form truncated surface 92. For example, as shown in FIG. 8, the portion trimmed from the triangular prism is a truncated area 98 (area within the dotted lines).

With reference to FIGS. 6A, 6B and 8, with the truncated triangular cross-section 89, the beamsplitter 56a of the three beam generator 20 receives the first portion 64a and the second portion 64b of the collimated light beam 62a at two incident surfaces 66a/96, 68a/94 where one of the two incident surfaces 68a/94 is truncated. The beamsplitter 56a is arranged in relation to the light source 50a so that the third portion 64c of the collimated light beam 62a bypasses the beamsplitter 56a and passes through the truncated area 98.

The laser beam generating device 10 utilizes the laser light generator 14 to generate up to five light beams along five directions which appear to originate from the common point 40. The laser light generator 14 uses a simple optics configuration for generating up to five light beams which have substantially equal power and strength. For example, the laser light generator 14 uses standard components, such as a prism for the beamsplitter 56. Thus, the cost of the laser beam generating device 10 may be lower than other beam generating devices that require custom components.

The laser beam generating device 10 includes a battery compartment 27 for holding batteries which power the device 10. The batteries may be alkaline batteries. In other embodiments, the laser beam generating device 10 may receive a power tool battery pack in order to power the device 10.

Figure 2:
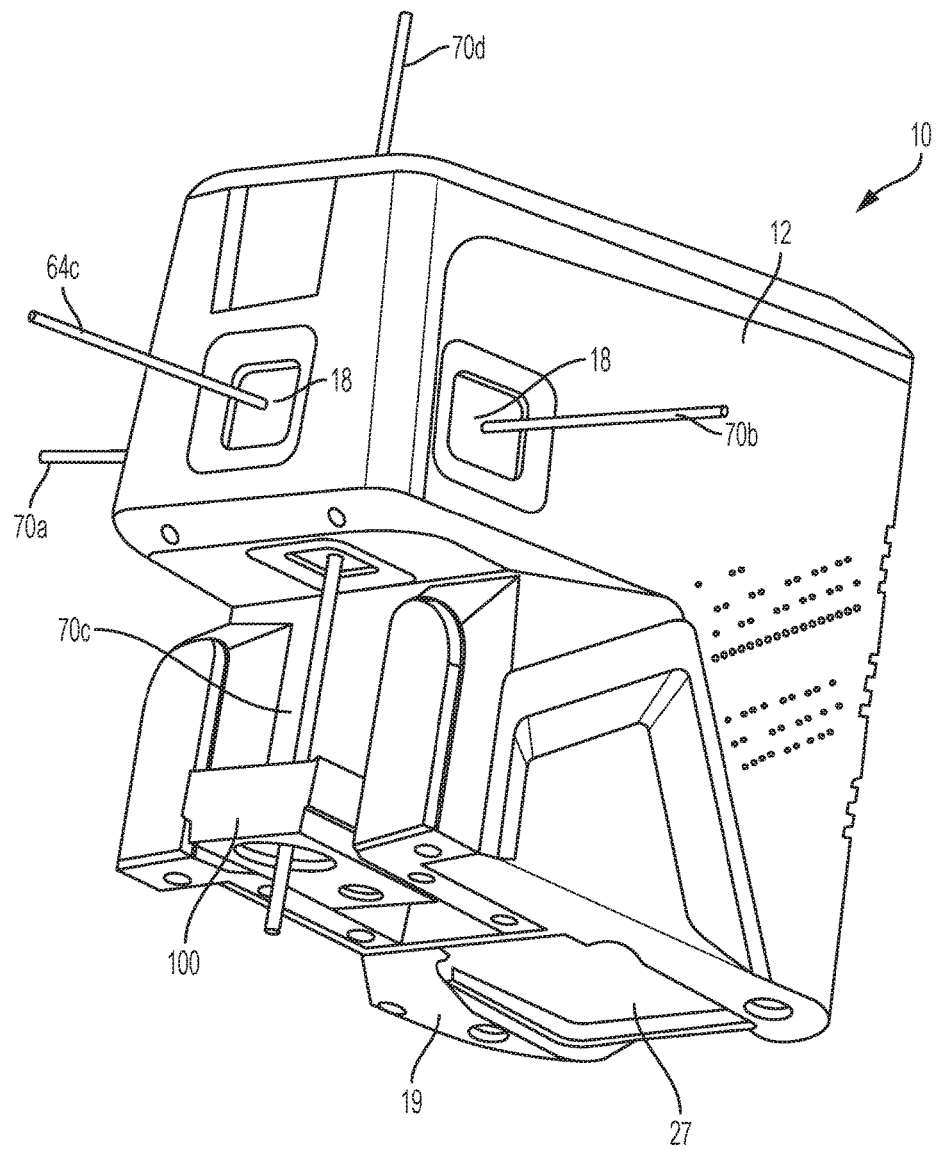
FIG. 2 illustrates an exemplary embodiment of a laser beam generating device with a mounting block in a second position.
Figure 3:
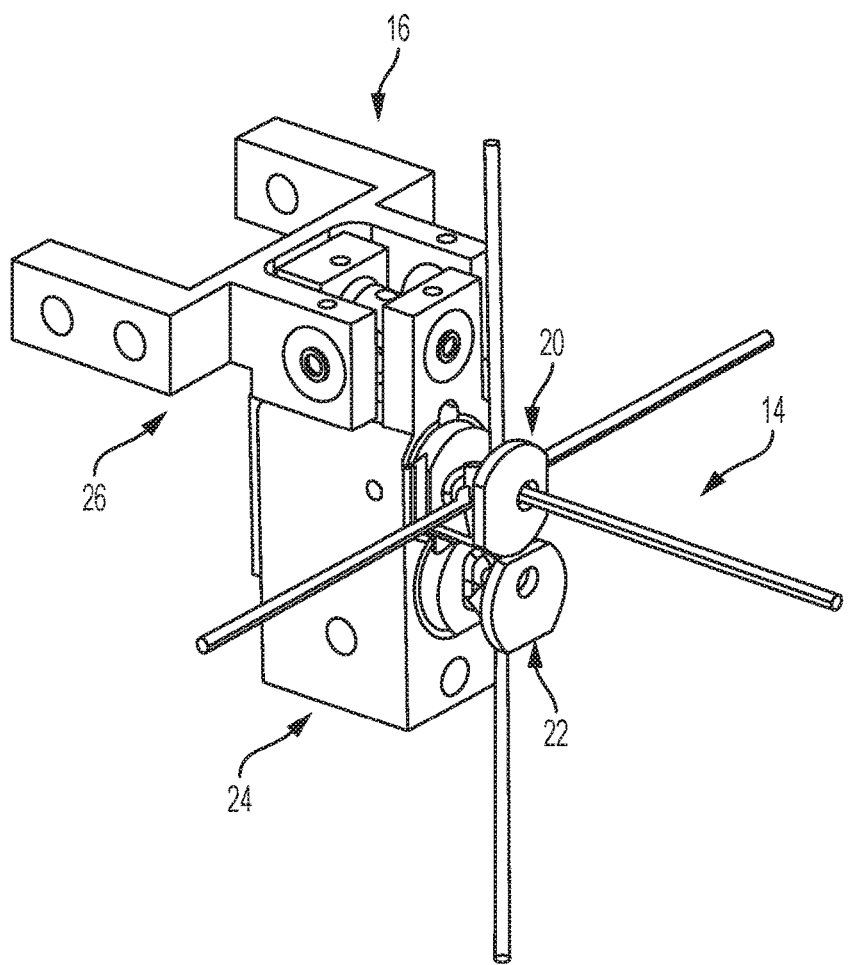
FIG. 3 is a perspective view of a leveling mechanism and a laser light generator of the laser beam generating device.
Figure 4:
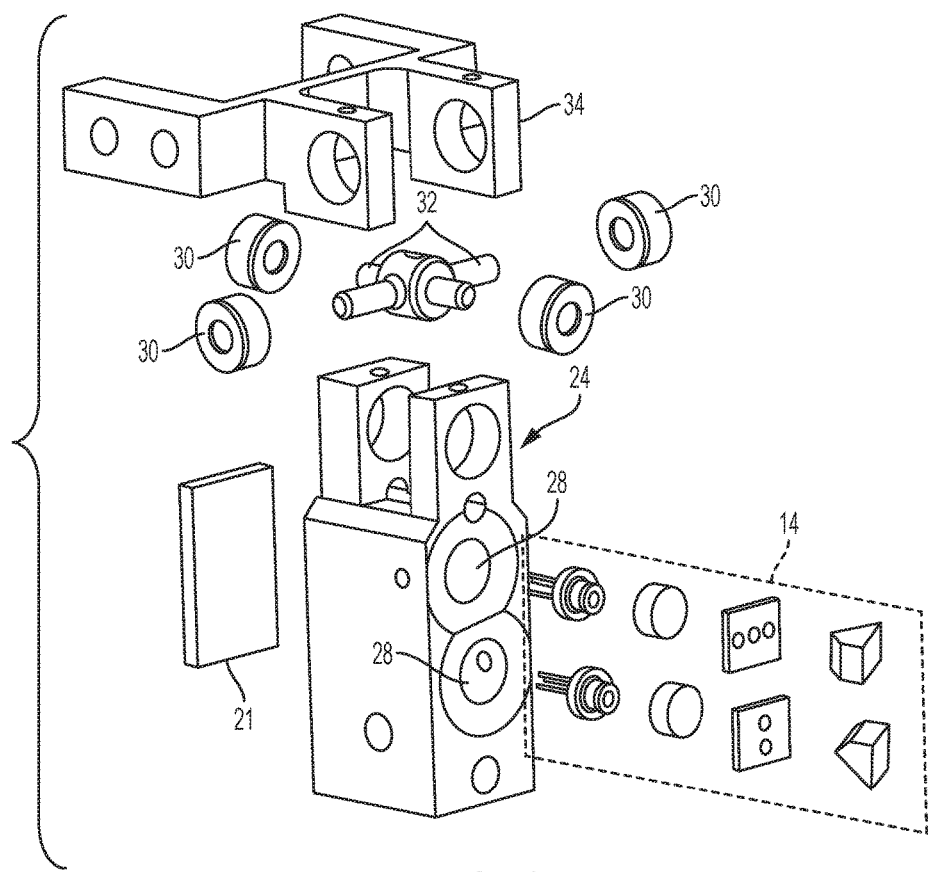
FIG. 4 is an exploded view of FIG. 3 depicting components of the leveling mechanism and the laser light generator.

As shown in FIGS. 1, 2 and 9-13, the laser beam generating device 10 includes a movable mounting bracket 100. As shown in FIGS. 1 and 2, the mounting bracket 100 can be located in a rear position (FIG. 1) or a forward position (FIG. 2). When the mounting block 100 is in the rearward position, the fourth output beam, which is a plumb laser beam passes in front of the mounting block 100. This allows, for example, the laser beam generating device 10 to be placed on its bottom side 19 on a ledge and the plumb laser beam to project in front of the ledge. When the mounting block 100 is in a forward position, the plumb laser beam 70c is aligned with the mounting block 100.

Figure 13:
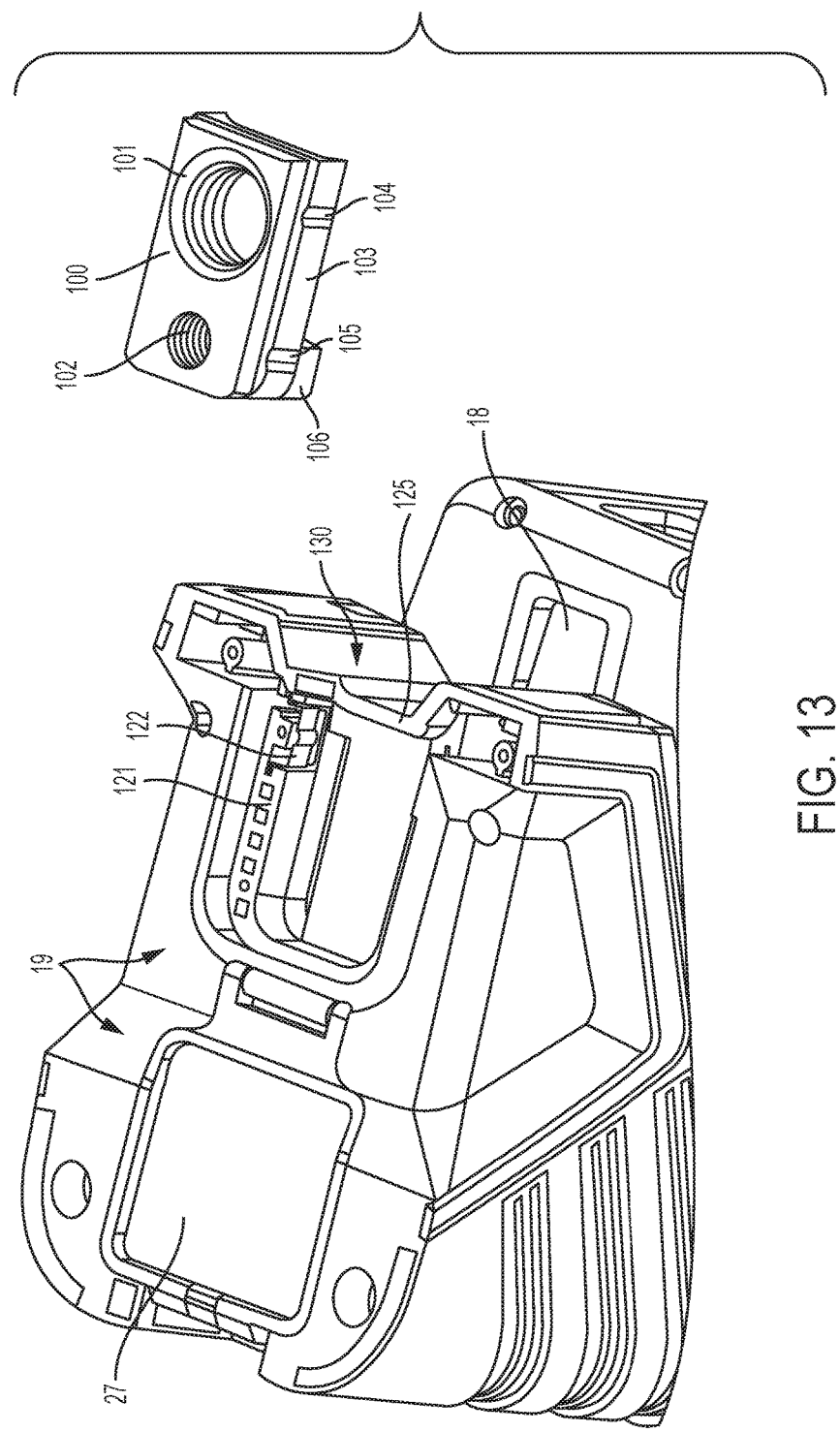
FIG. 13 is a perspective view of the exemplary embodiment of the laser beam generating device with an exploded view of mounting block

A structure of the mounting block 100 is best shown in FIG. 13. As shown in FIG. 13, the mounting block has a first mounting thread 101 and a second mounting thread 102. In the exemplary embodiment, the first mounting thread 101 is a ⅝-11 mounting thread and the second mounting thread 102 is a ¼-20 mounting thread. These sizes may be swapped or changed in various embodiments. The mounting threads 101, 102 are designed so that they can be threaded onto a threaded mounting post, such as a threaded mounting post on a tripod. This allows the laser beam generating device 10 to be securely mounted.

As shown in FIG. 13, the mounting block 100 includes a mounting rail 103. The mounting rail 103 is mounted at the bottom side 19 of the laser beam generating device 10 on rail support 121. The mounting rail 103 includes a first detent 104 and a second detent 105 for positioning the mounting block 100 in the two previously described positions. Operation of the detents 104, 105 will be described in further detail below. The mounting block 100 also includes a stop 106. When the mounting block 100 is assembled in the laser beam generating device 10, the stop 106 prevents the mounting block 100 from sliding axially out of the laser beam generating device 10. Particularly, when the mounting block 100 is slid in a direction away from the battery compartment 27, the stop 106 eventually contacts the retainer 125 which prevents further sliding movement of the mounting block 100 along the rail support 121.

Figure 9:
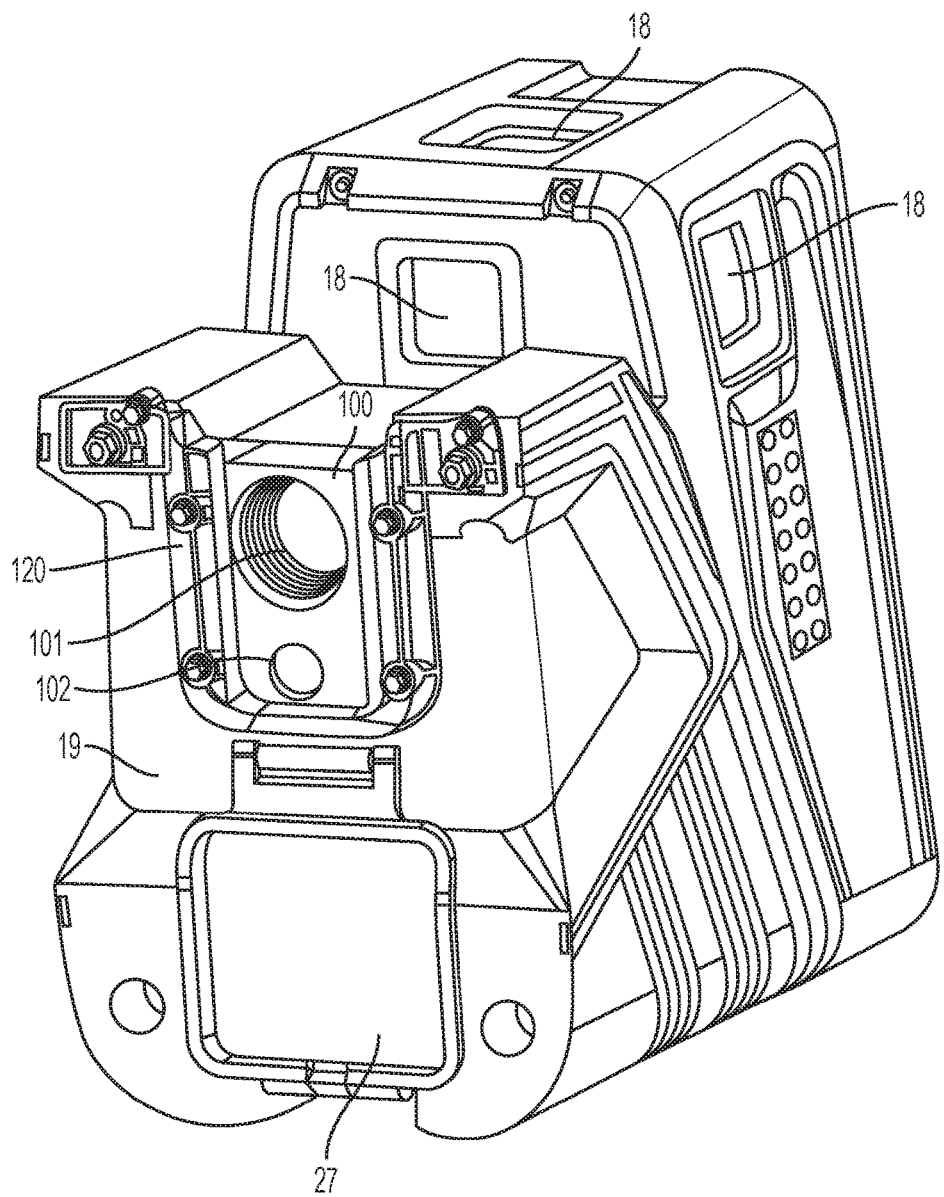
FIG. 9 is a perspective bottom view of the exemplary embodiment of the laser beam generating device.

The mounting block 100 is kept in place in an axial direction by axial retainer 120, as shown in FIG. 9. The axial retainer 120 is removed in FIGS. 10-13 to show the rail support 121 and other parts of the device 10. As shown in FIG. 9, the mounting block 100 is sandwiched between the axial retainer 120 to axially retain the mounting block 100.

Figure 10:
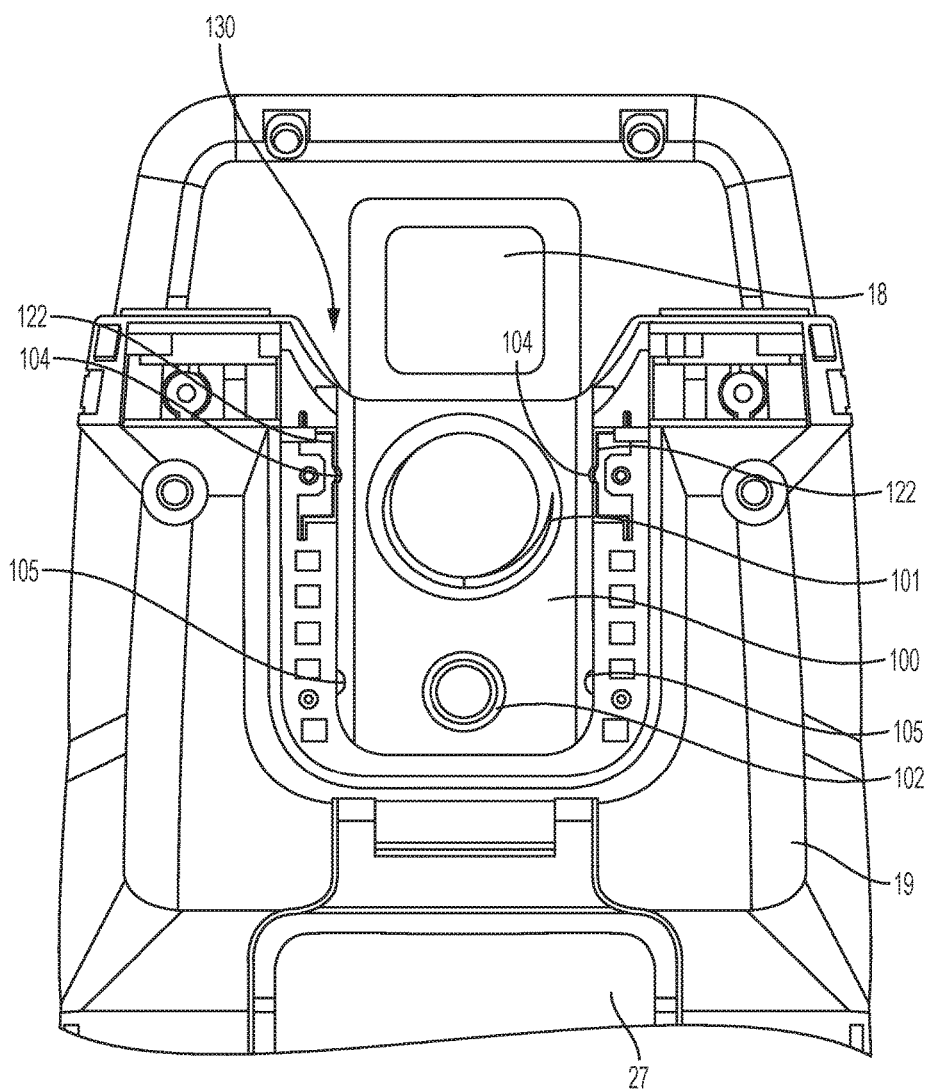
FIG. 10 is a bottom view of the exemplary embodiment of the laser beam generating device with the mounting block in a rearward position.
Figure 11:
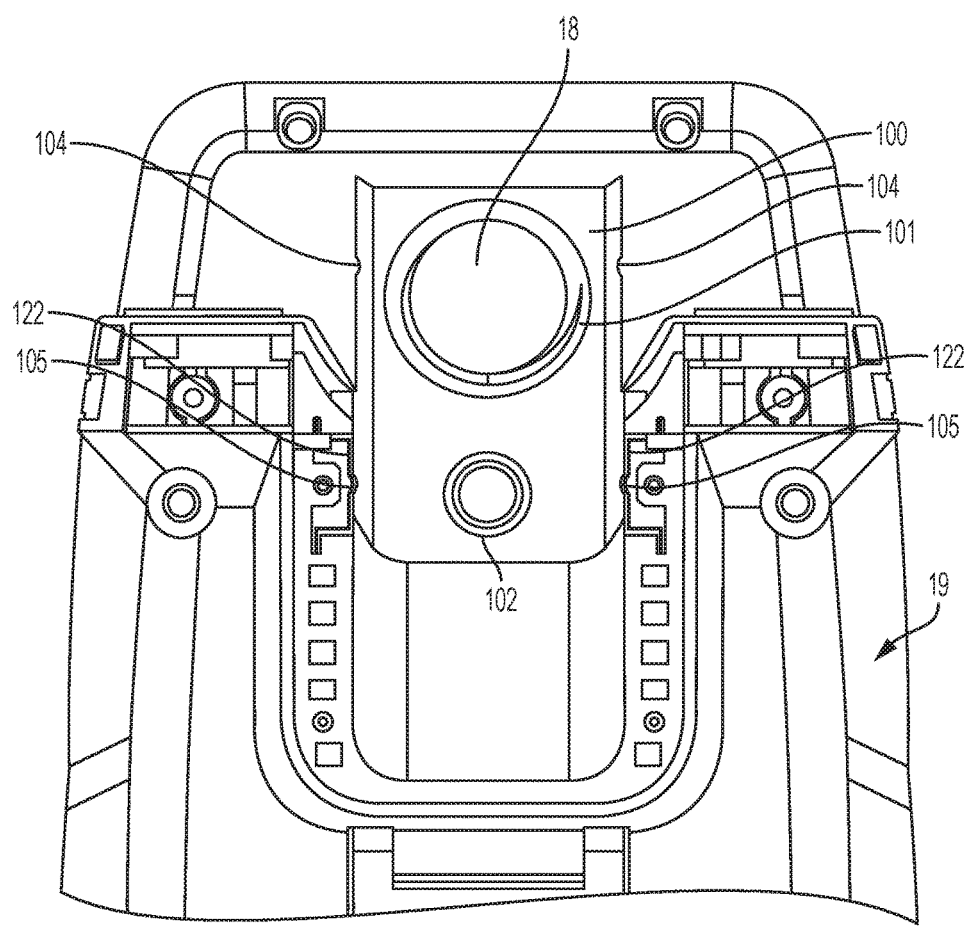
FIG. 11 is a bottom view of the exemplary embodiment of the laser beam generating device with the mounting block in a forward position.
Figure 12:
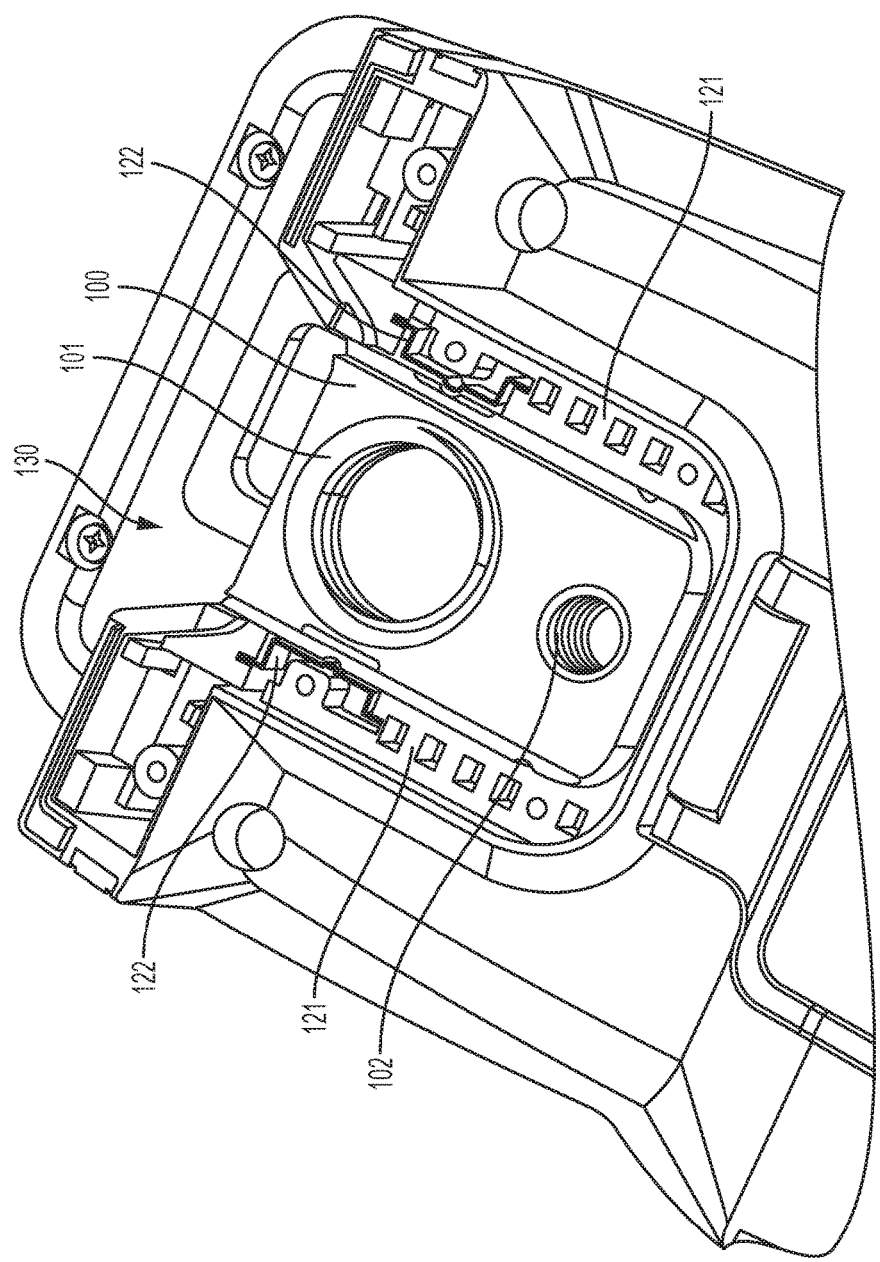
FIG. 12 is another perspective bottom view of the exemplary embodiment of the laser beam generating device.

Movement of the mounting block 100 between the forward and rearward positions will now be described in more detail with respect to FIGS. 10-13. As previously noted, the axial retainer 120 is not shown in FIGS. 10-13. As shown in those Figs., a pair of detent springs 122 are secured at the rail support 121 adjacent to retainer 125. The detent springs 122 interact with the detents 104 and 105 to secure the mounting block in either the forward position or the rearward position. For example, FIG. 10 shows the mounting block 100 secured in a rearward position. As shown in FIG. 10, the detent springs 122 engage the first detents 104 in order to secure the mounting block 100 in the rearward position. The first detents 104 and springs 122 prevent the mounting block 100 from unwanted movement, though a user can apply sufficient force to move the mounting block 100 to the forward position, as shown in FIG. 11. As will be appreciated, the amount of force which is necessary to move the mounting block 100 can be varied based upon characteristics of the detent springs 122 and the detents 104.

FIG. 10 shows a view of the laser beam generating device from its bottom. As shown in FIG. 10, when the mounting block 100 is in the rearward position, the opening 18 which faces downward (toward the bottom side 19 of the laser beam generating device 10) is not blocked or otherwise overlapped by the mounting block 100. Accordingly, the plumb beam 70c can freely pass in front of the mounting block. As can be appreciated, the laser beam generating device 10 can be placed on a ledge so that the downward facing opening 18 of FIG. 10 is over the ledge and can provide an un-impeded plumb beam with the fourth output beam 70c.

FIG. 11 illustrates the mounting block 100 in the forward position. In the forward position, the detent springs 122 now engage the second detents 105. As previously discussed, a user may apply a force to slide the mounting block between the rearward position shown in FIG. 10 and the forward position shown in FIG. 11. As with FIG. 10, FIG. 11 shows a view of the laser beam generating device 10 from its bottom. As can be seen in FIG. 11, the downward facing opening 18 through which the fourth output beam 70c is projected to produce a plumb beam is aligned with the mounting thread. As seen in FIG. 13, the mounting thread 101 is hollow. Accordingly, as shown in FIG. 11, the opening 18 that is facing downwardly is shown through the center of the first mounting thread 101. Accordingly, if the laser beam generating device 10 is not mounted or is mounted on a hollow mounting post, the further output beam 70c can project through the mounting thread 101 and, if applicable, hollow post.

As will be appreciated, when in the forward position shown in FIG. 11. The first mounting thread 101 is also aligned with the fifth output beam 70d, along with the fourth output beam 70c. Accordingly, when the laser beam generating device 10 is rotated about a vertical access, the fourth output beam 70c is coaxial with the rotation axis and, the common point of origin of the first and second output beams 70a, 70b is not changed. Additionally, when such rotation occurs, the fourth and fifth output beams 70c, 70d (vertical beams) are not shifted. Accordingly, this can be an advantageous mounting position when using the laser beam generating device 10.

Figure 14:
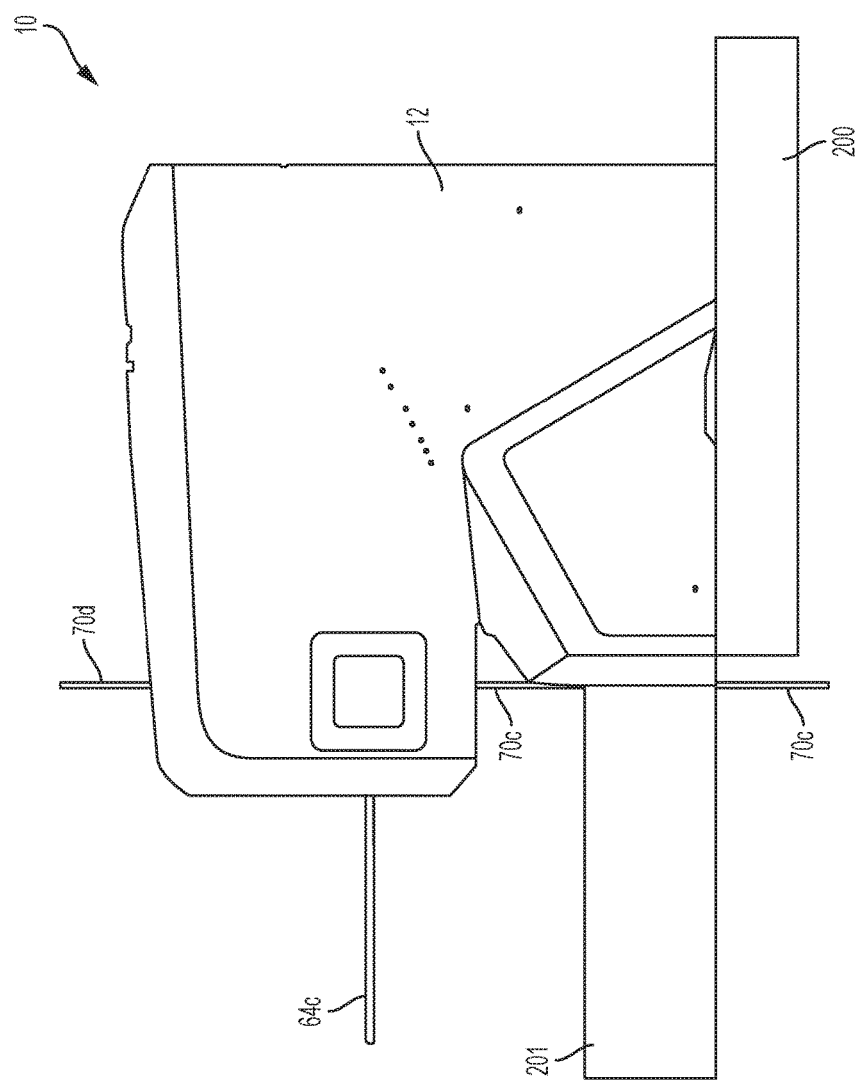
FIG. 14 is a side view of the exemplary embodiment of the laser beam generating device aligned to edge of stud.
Figure 15:
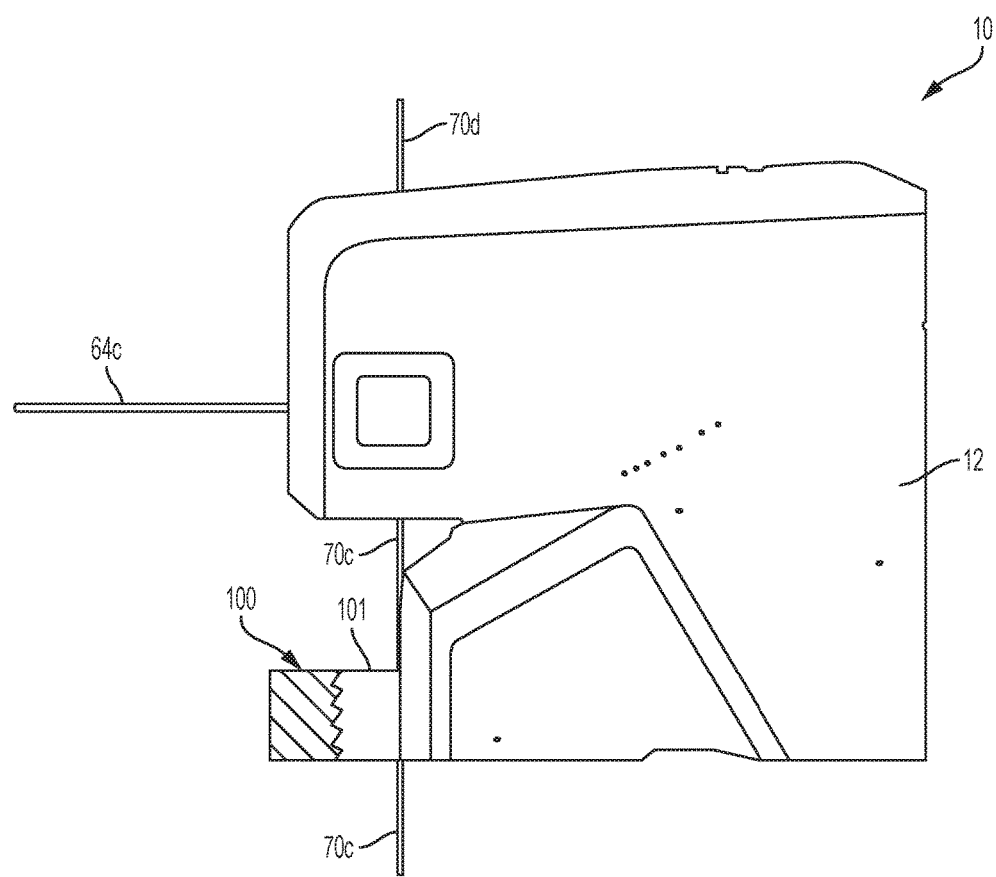
FIG. 15 is another side view of the exemplary embodiment of the laser beam generating device.

FIG. 14 is a side view of the laser beam generating device 10 when the mounting block 100 is in the rear position and FIG. 15 is a side view of the laser beam generating device 10 when the mounting block 100 is in the forward position. In FIG. 14, the laser beam generating device 10 is set on a support 200 and a front surface is aligned against a wood stud 201. The support 200 is horizontal and has a flat surface. As shown in FIG. 14, the fourth output beam 70c creates a plumb beam that is aligned with an edge of the stud 201. In the embodiment shown in FIG. 14, where a front of the laser device 10 extends beyond the support 200, the beam 70c is also able to pass in front of the support 200. As will be understood, the relative placement of laser beam generating device 10 and the support 200 could be changed so that the all of the laser device 10 was on the support 200. As shown in the Figs., the housing 12 also includes a recess 130 to accommodate the opening 18 that faces downward and the beam 70c which projects from the opening 18. The laser beam generating device 10 has the ability to be attached to a metallic or wooden stud so that the vertical laser axis aligns with the edge of the stud.

In FIG. 15, the mounting block 100 is moved to the forward position and the beam 70c is aligned with the first mounting thread 101 such that it passes through the block 100. This type of mount also allows the laser device 10 to be mounted via the ⅝-11 mounting thread 101 to a tripod or accessory mount. And while mounted, be able to rotate the laser device 10 around its vertical axis (output beams 70c and 70d). This allows the vertical axis of beams 70c and 70d to remain stationary while the laser beam generating device 10 is rotated around its mount, in this case, first mounting thread 101.

Figure 16:
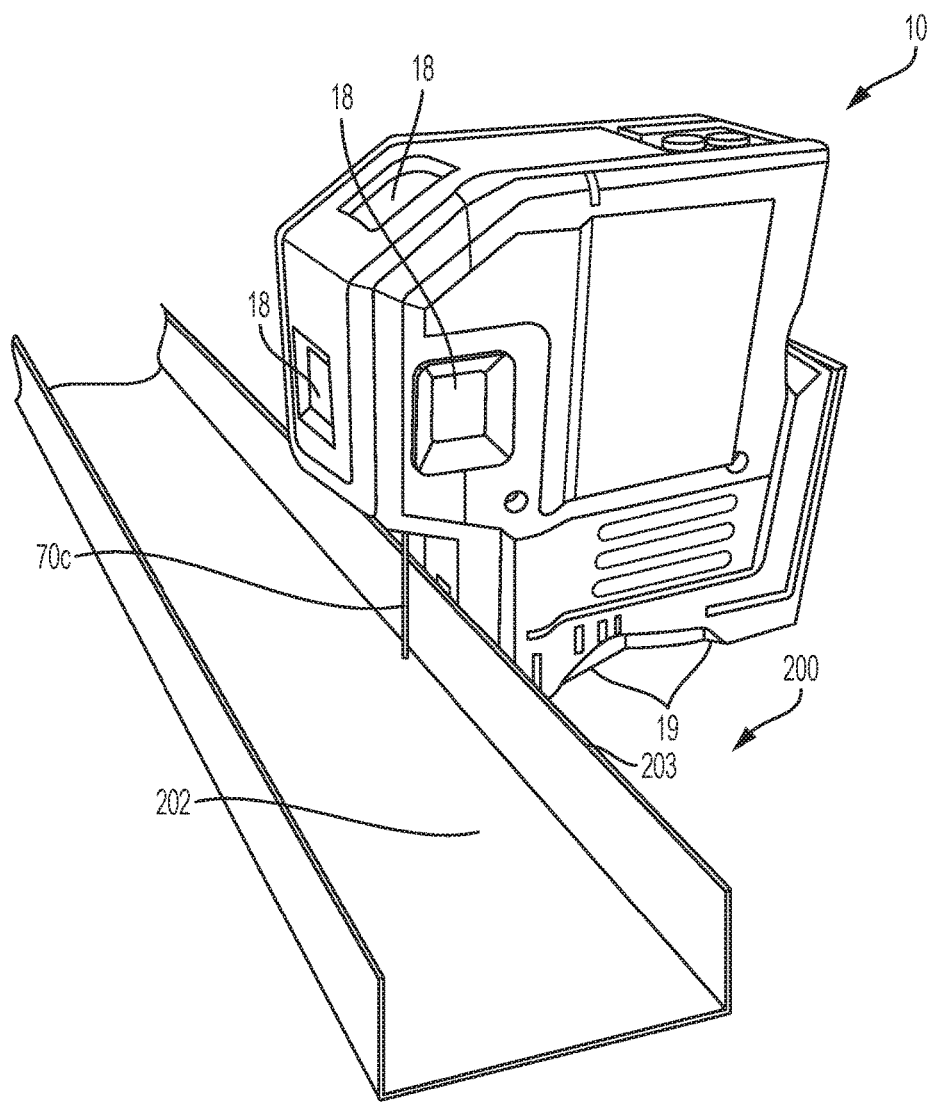
FIG. 16 is a perspective view of the exemplary embodiment of the laser beam generating device aligned to edge of metal stud.

FIG. 16 illustrates an exemplary embodiment of the laser beam generating device 10 being used with a metal stud 202. As shown, a front of the laser device 10 is pressed against the metal stud 202 while the stud 202 and the laser device 10 are supported by surface 200. This configuration aligns output beam 70c with the edge 203 of the metal stud 202.

While the invention has been described by way of exemplary embodiments, it is understood that the words which have been used herein are words of description, rather than words of limitation. Changes may be made within the purview of the appended claims, without departing from the scope and spirit of the invention in its broader aspects.

What is claimed is:

1. A laser beam generating device, comprising:
a housing;
a laser light generator disposed in the housing and operable to generate two output beams which project outside of the housing, the laser light generator including a light source;
a leveling mechanism on which the laser light generator is disposed;
a mounting member disposed on the housing and configured to mount the laser beam generating device on a screw thread;
wherein the mounting member is movable relative to the housing between a first position and a second position.

2. The laser beam generating device of claim 1, wherein the mounting member includes a first mounting thread.

3. The laser beam generating device of claim 2, wherein in the first position, the first mounting thread is aligned with at least one of the two output beams; and
wherein in the second position, the first mounting thread is offset with respect to the at least one of the two output beams.

4. The laser beam generating device of claim 3, wherein the at least one of the two output beams includes a plumb beam.

5. The laser beam generating device of claim 3, wherein the mounting member further comprises a second mounting thread, the second mounting thread being of a different size than the first mounting thread.

6. The laser beam generating device of claim 3, wherein the mounting member is slidable between the first position and the second position.

7. The laser beam generating device of claim 3, wherein the mounting member includes engagement members configured to secure the mounting member in the first position and the second position; and
wherein the housing includes housing engagement elements which engaged the engagement members to secure the mounting member in the first position and the second position.

8. The laser beam generating device of claim 7, wherein the engagement members comprise detents and the housing engagement elements comprise detent springs.

9. A laser beam generating device, comprising:
a housing;
a laser light generator disposed in the housing and operable to generate two output beams which project outside of the housing, the laser light generator including a light source;
a leveling mechanism on which the laser light generator is disposed;
a mounting block including a first mounting thread;
wherein the mounting block is secured to the housing and movable between a first position and a second position relative to the housing.

10. The laser beam generating device of claim 9, wherein the mounting block is slidable between the first position and the second position.

11. The laser beam generating device of claim 10, wherein the housing includes a mounting rail and the mounting block is slidable along the mounting rail.

12. The laser beam generating device of claim 9, wherein the mounting block includes detents configured to secure the sliding block at the first position and at the second position.

13. The laser beam generating device of claim 9, wherein the mounting block includes a second mounting thread which is different in size than the first mounting thread.

14. The laser beam generating device of claim 9, wherein in the first position, the first mounting thread is aligned with at least one of the two output beams; and
wherein in the second position, the first mounting thread is offset with respect to the at least one of the two output beams.

15. The laser beam generating device of claim 14, wherein the at least one of the two output beams comprises a plumb beam.

16. A laser beam generating device, comprising:
a housing including at least one opening for emitting an output beam;
a laser light generator disposed in the housing and operable to generate an output beam;
a leveling mechanism on which the laser light generator is disposed;
a mounting member secured to the housing and configured to mount the laser beam;
wherein the mounting member is movable relative to the housing to at feast a first position and a second position;
wherein the mounting member includes a first mounting feature; and
wherein the output beam is aligned with the first mounting feature when the mounting member is in the first position.

17. The laser beam generating device of claim 16, wherein the output beam is a plumb beam; and wherein, when the housing is placed on a level horizontal surface and the mounting member is in the second position, the plumb beam passes in front of the first mounting feature.

18. The laser beam generating device of claim 17, wherein the mounting feature is a mounting thread.

19. The laser beam generating device of claim 18, wherein the mounting block includes detents configured to secure the mounting block in the first position and the second position.

* * * * *